United States Patent
Nakamura (10) Patent No.: US 7,502,685 B2
(45) Date of Patent: Mar. 10, 2009

(54) VEHICLE NAVIGATION APPARATUS AND METHOD WITH TRAVELING DIRECTION INDICATION AT GUIDANCE INTERSECTION

(75) Inventor: Hikaru Nakamura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 164 days.

(21) Appl. No.: 11/203,658

(22) Filed: Aug. 12, 2005

(65) Prior Publication Data

US 2006/0195257 A1    Aug. 31, 2006

(30) Foreign Application Priority Data

Aug. 25, 2004    (JP)    ............................. 2004-245746

(51) Int. Cl.
G01C 21/30    (2006.01)
G01C 21/32    (2006.01)

(52) U.S. Cl. .................. 701/211; 701/202; 701/208; 701/207; 701/209; 340/988; 340/990; 340/995.1; 345/589; 345/597; 345/598; 345/599; 345/625; 345/638; 345/650; 345/440; 345/440.1; 345/441; 345/442; 345/443; 345/552; 345/530; 345/960; 345/FOR. 210; 382/113; 382/163; 382/164; 382/166; 382/167; 382/171; 382/172; 382/174; 382/287

(58) Field of Classification Search .................. 701/211, 701/202, 208, 207, 209; 340/990, 995, 988; 73/178 R; 345/589, 597, 598, 599, 625; 345/638, 650, 440, 440.1, 441, 442, 443, 345/552, 530, 690, 960, FOR. 210; 382/113, 382/163, 164, 166, 167, 171, 172, 174, 287

See application file for complete search history.

(56) References Cited

U.S. PATENT DOCUMENTS

| | | | | |
|---|---|---|---|---|
| 4,939,661 A | * | 7/1990 | Barker et al. | 701/200 |
| 5,303,159 A | * | 4/1994 | Tamai et al. | 701/210 |
| 5,323,321 A | * | 6/1994 | Smith, Jr. | 701/211 |
| 5,416,478 A | * | 5/1995 | Morinaga | 340/995.27 |
| 5,638,279 A | * | 6/1997 | Kishi et al. | 701/200 |
| 5,654,892 A | * | 8/1997 | Fujii et al. | 701/211 |
| 5,832,406 A | * | 11/1998 | Iwami et al. | 701/202 |
| 5,874,905 A | * | 2/1999 | Nanba et al. | 340/995.2 |
| 5,893,045 A | * | 4/1999 | Kusama et al. | 701/211 |
| 5,902,349 A | * | 5/1999 | Endo et al. | 701/202 |
| 5,904,728 A | * | 5/1999 | Tamai et al. | 701/211 |
| 5,938,718 A | * | 8/1999 | Morimoto et al. | 701/201 |
| 5,945,927 A | * | 8/1999 | Nakayama et al. | 340/995.14 |

(Continued)

Primary Examiner—Khoi Tran
Assistant Examiner—Jorge O Peche
(74) Attorney, Agent, or Firm—Brinks Hofer Gilson & Lione (57) ABSTRACT

A vehicle navigation apparatus is provided which can reliably guide a vehicle along a guidance route when the vehicle approaches an intersection of interest at which it is to make a turn even if another intersection exists between a vehicle position and the intersection of interest. A controller determines whether or not another intersection exists between the vehicle position and the next guidance intersection (an intersection at which the vehicle is to make a turn) when the vehicle reaches a predetermined distance from the guidance intersection. If another intersection is determined to exist, an intersection guidance map with an arrow indicative of the guidance route colored in a predetermined color is displayed on a display device. In one embodiment, if another intersection does not exist between the vehicle and the guidance intersection, the color of the arrow displayed is changed to a different color.

21 Claims, 8 Drawing Sheets

U.S. PATENT DOCUMENTS

| | | | |
|---|---|---|---|
| 5,983,158 A * | 11/1999 | Suzuki et al. | 701/209 |
| 6,006,161 A * | 12/1999 | Katou | 701/212 |
| 6,018,697 A * | 1/2000 | Morimoto et al. | 701/209 |
| 6,035,253 A * | 3/2000 | Hayashi et al. | 701/211 |
| 6,249,740 B1 * | 6/2001 | Ito et al. | 701/200 |
| 6,269,304 B1 * | 7/2001 | Kaji et al. | 701/209 |
| 6,278,941 B1 * | 8/2001 | Yokoyama | 701/209 |
| 6,405,131 B1 * | 6/2002 | Barton | 701/211 |
| 6,415,224 B1 * | 7/2002 | Wako et al. | 701/208 |
| 6,446,000 B2 * | 9/2002 | Shimabara | 701/209 |
| 6,473,693 B1 * | 10/2002 | Kusama | 701/211 |
| 6,735,517 B2 * | 5/2004 | Engelsberg et al. | 701/209 |
| 7,127,350 B2 * | 10/2006 | Oikubo | 701/211 |
| 2002/0010543 A1 * | 1/2002 | Watanabe et al. | 701/211 |
| 2002/0049533 A1 * | 4/2002 | Kusano et al. | 701/209 |
| 2003/0078729 A1 * | 4/2003 | Ohdachi et al. | 701/211 |
| 2004/0162672 A1 * | 8/2004 | Kim | 701/209 |
| 2005/0049786 A1 * | 3/2005 | Odachi et al. | 701/211 |
| 2005/0119826 A1 * | 6/2005 | Lee et al. | 701/209 |
| 2005/0177304 A1 * | 8/2005 | Tu | 701/211 |
| 2005/0256638 A1 * | 11/2005 | Takahashi et al. | 701/209 |
| 2005/0288859 A1 * | 12/2005 | Golding et al. | 701/211 |
| 2006/0100779 A1 * | 5/2006 | Vergin | 701/211 |
| 2006/0229807 A1 * | 10/2006 | Sheha et al. | 701/209 |

* cited by examiner

VEHICLE NAVIGATION APPARATUS AND METHOD WITH TRAVELING DIRECTION INDICATION AT GUIDANCE INTERSECTION

BACKGROUND OF THE INVENTION

1. Field of the Invention

The present invention relates to a vehicle navigation apparatus which is designed to search for a guidance route to a destination and to appropriately provide guidance information for guiding a vehicle along the guidance route.

2. Description of the Related Art

Conventional vehicle navigation apparatuses include a map-data storage device for storing therein map data, such as a digital versatile disk (DVD) or a hard disk, a display device such as a liquid crystal panel, and a vehicle position detector for detecting a present position of the vehicle and a present traveling direction thereof, such as a gyro, a global positioning system (GPS) receiver, and/or a vehicle speed sensor. In the navigation apparatus, map data including information around the present vehicle position is read from the map-data storage device. Based on the map data, a map image covering the present vehicle position and its surroundings is drawn and displayed on the display device with a vehicle position (location) mark superimposed on the map image. The map image is scrolled, or the vehicle position mark is moved with the map image fixed on a screen, in accordance with movement of the vehicle, thus allowing a user to understand the present traveling position of the vehicle at a glance.

Vehicle navigation apparatuses generally have the function of route guidance that enables the user to easily travel along an appropriate route to a desired destination without taking a wrong path. This route guidance function automatically searches for a route with the lowest cost connecting a starting point and the destination using the map data by a simulation calculation, such as the lateral search method or the Dijkstra method, and the resultant route is stored as a guidance route. During travel, the guidance route is drawn and displayed on the map by a thick line in a color different from that of other roads. Alternatively or additionally, when the vehicle is approaching an intersection on the guidance route at which it is to make a turn (i.e., at which it is to turn right or left), an arrow representing a traveling direction to be taken at the intersection is drawn on the map image, thereby guiding the user toward the destination.

The cost, as the term is used herein, may represent a value obtained by multiplying a distance of a road by a constant depending on the width of the road, the type of the road (general road, or highway), the direction of a turn, namely a right turn or a left turn, or the like. Alternatively or additionally, the cost may represent a time required for the vehicle to pass through the road on the basis of the distance of the road. That is, the cost may be a numeric value indicating the degree of appropriateness of the guidance route. Even if there are two roads with the same distance, the costs of the respective roads depend on, for example, whether the user makes use of a highway or not, or whether the user gives a high priority to the distance or the time, and thus may be different from each other.

Generally, the vehicle navigation apparatus displays an intersection guidance map on the display device, for example, when the vehicle is approaching an intersection on the guidance route at which it is to turn right, while providing voice guidance, for example, "Turn right at the next intersection". On the intersection guidance map, roads located around the intersection are displayed in the form of a simple figure, and facilities located in the vicinity of the intersection are displayed as landmarks. Driving according to the voice guidance and/or the intersection guidance map enables the user to reach the destination with safety and comfort. Hereinafter, the intersection at which the vehicle is to make a turn, that is, the intersection of interest for guidance, is referred to as a guidance intersection, while an intersection other than the guidance intersection is referred to as a non-guidance intersection.

However, when the non-guidance intersection is located before the guidance intersection, the user may wrongly make a turn at the non-guidance intersection and not at the guidance intersection, thus causing the vehicle to depart from the guidance route.

U.S. Pat. No. 5,904,728 discloses a vehicle navigation system which is adapted to change the timing of providing voice guidance or to alter the contents of voice guidance, depending on whether or not a non-guidance intersection exists between a present vehicle position and a guidance intersection. Even in the vehicle navigation system disclosed in this patent, however, the user may miss the voice guidance, disadvantageously causing the vehicle to make a turn at the non-guidance intersection by mistake.

SUMMARY OF THE INVENTION

Accordingly, it is an object of the invention to provide a vehicle navigation apparatus that can reliably guide a vehicle along a guidance route when the vehicle approaches an intersection of interest at which it is to make a next turn even if another intersection exists between the vehicle position and the junction of interest.

To solve the foregoing problems encountered with the known art, according to one aspect of the present invention, there is provided a vehicle navigation apparatus which comprises a display device, a vehicle position detector for detecting a present position of a vehicle, a map-data storage section for storing therein map data, and a controller for searching for a guidance route from a starting point to a destination based on the vehicle position detected by the vehicle position detector and on the map data read from the map-data storage section, and for displaying on the display device a mark indicative of a traveling direction to be taken at an intersection where the vehicle is to make a turn such that the vehicle travels along the guidance route. When the vehicle reaches a predetermined distance from the intersection at which the vehicle is subsequently to make the turn, the controller determines whether or not another intersection exists between the vehicle position and the intersection of interest. If another intersection exists, the controller displays the mark in a first display form. If another intersection does not exist between the vehicle position and the intersection at which the vehicle is to make the turn, the controller displays the mark in a second display form different than the first display form.

In the invention, when the vehicle reaches the predetermined distance from the intersection (for example, a junction) at which it is subsequently to make a turn, it is determined whether or not another intersection exists between the vehicle position and the intersection of interest. If another intersection is determined to exist, the mark representing the guidance route (for example, an arrow) is displayed in the first display form (for example, in red) on the display device. In contrast, if another intersection does not exist between the vehicle position and the intersection at which the vehicle is to make the turn, the mark is displayed in the second display form (for example, in orange) different than the first display form. Thus, the mark being displayed in the first form permits a user to understand the existence of another intersection, that is, an intersection at which the vehicle is not to make a turn.

Changing from the first display form to the second display form can instruct the user to make a turn at the next intersection. This permits the user to travel the guidance route with no mistakes.

DESCRIPTION OF THE PREFERRED EMBODIMENTS

Some preferred embodiments of the present invention will be described hereinafter with reference to the accompanying drawings.

Figure 1:
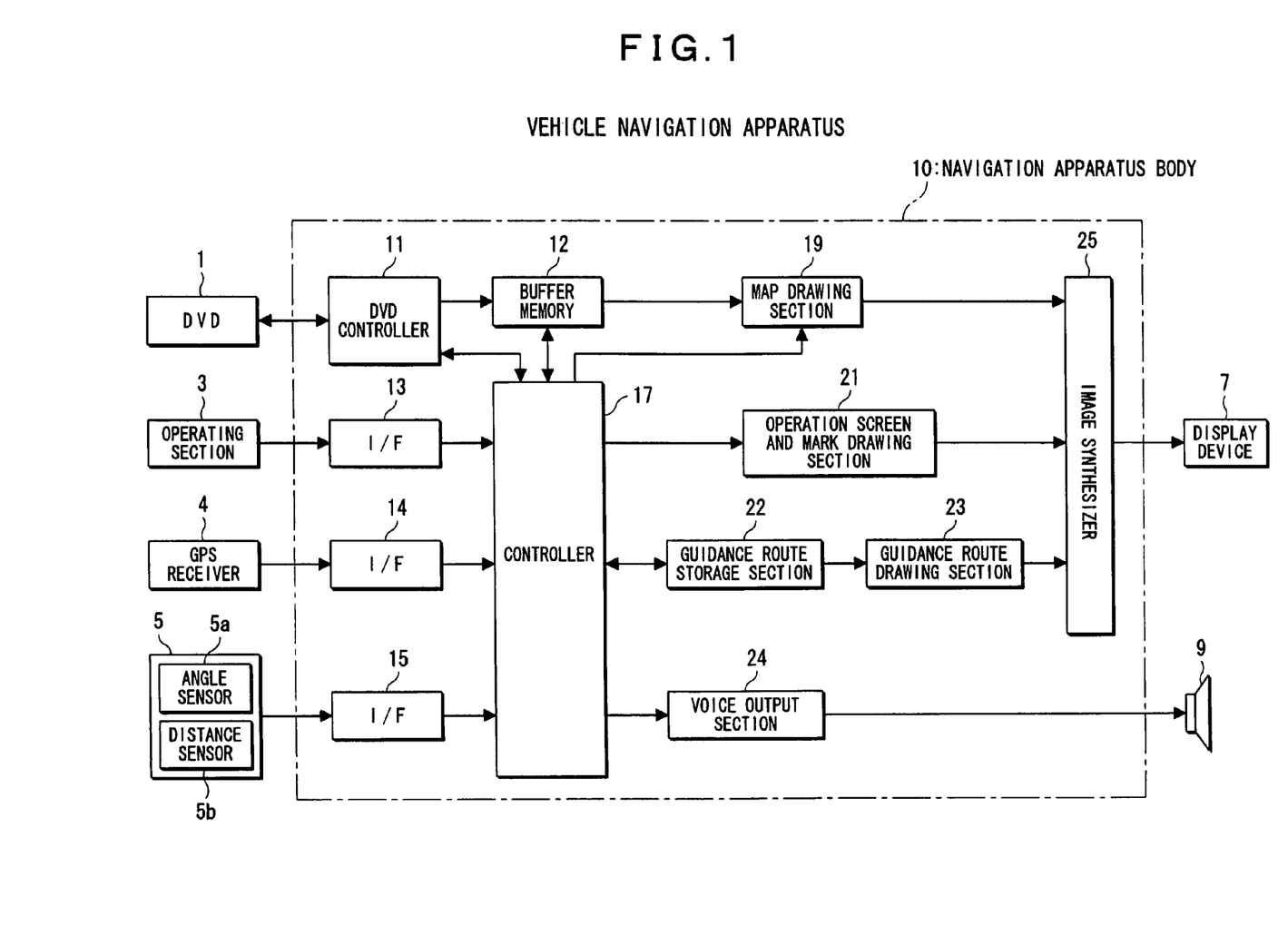
FIG. 1 is a block diagram showing a configuration of a vehicle navigation apparatus according to one preferred embodiment of the invention.

FIG. 1 shows a block diagram of a configuration of a vehicle navigation apparatus according to one preferred embodiment of the invention.

Referring to FIG. 1, a DVD 1 stores therein map data and the like. The map data stored in the DVD 1 is divided into many pieces, each having the appropriate longitudinal and latitudinal widths according to the scale, including 1:12500, 1:25000, 1:50000, 1:100000 or the like. Roads or the like are recorded in the data as coordinate sets of grid points (nodes), each defined by the longitude and latitude. The road is composed of a connection between two or more nodes, and a part connecting between two nodes is referred to as a link. Further, the map data is composed of (1) a road layer including a road list, a node table, an intersection configuration node list, and the like, (2) a background layer for displaying a road, a building, a park, a river, and the like on a map image, and (3) character and symbol layer for displaying names of administrative areas, such as a city, a town, or a village, names of roads, names of intersections, names of facilities, and map symbols. Further, the map data includes landmark data for displaying a facility serving as a landmark on the map.

An operating section 3 has various operating buttons or the like for operating a navigation apparatus body 10, which is described later.

A GPS receiver 4 receives a GPS signal transmitted from a GPS satellite to detect the longitude and latitude of a present position of the vehicle. A self-contained navigation sensor 5 includes an angle sensor 5a, such as a gyro, for detecting a rotation angle of the vehicle, and a traveling distance sensor 5b for generating a pulse at regular travel intervals.

A display device 7 is capable of displaying map images, such as a liquid crystal panel. On the display device 7, the navigation apparatus body 10 displays a map covering the present position of the vehicle and its surroundings, guidance information including a guidance route from a starting point to a destination, a mark indicating the vehicle position, and the like. A speaker 9 provides the user with the guidance information by voice.

The navigation apparatus body 10 is composed of the following components.

A DVD controller 11 reads the map data from the DVD 1. A buffer memory 12 temporarily stores therein the map data read from the DVD 1. Interfaces 13, 14, and 15 are connected to the operating section 3, the GPS receiver 4, and the self-contained navigation sensor 5, respectively.

A controller 17 consists of a microcomputer, and performs various types of processing, which involves detecting the present vehicle position based on signals received from the interfaces 14 and 15, reading the map data covering the present vehicle position and its surroundings from the DVD 1 into the buffer memory 12, and searching for a guidance route from the starting point to the destination based on a set search condition using the map data in the buffer memory 12.

A map drawing section 19 draws or renders the map image using the map data in the buffer memory 12.

An operation screen and mark drawing section 21 draws various types of menu screens (operation screens) depending on operation conditions, and various kinds of marks including a vehicle position mark, a cursor, and the like.

A guidance route storage section 22 stores therein the guidance route found by the controller 17, and a guidance route drawing section 23 draws the guidance route. In the guidance route storage section 22, all nodes of the guidance route from the starting point to the destination, which route has been searched for by the controller 17, are stored. The guidance route drawing section 23 reads guidance route information (node series) from the guidance route storage section 22, and draws the guidance route in a color and thickness different from those of other roads.

A voice output section 24 supplies a voice signal to the speaker 9 based on a signal from the controller 17. An image synthesizer 25 superimposes various marks and an operation screen drawn by the operation screen and mark drawing section 21, and the guidance route drawn by the guidance route drawing section 23, on the map image drawn by the map drawing section 19 to supply them to the display device 7.

In the vehicle navigation apparatus with this arrangement, the controller 17 detects the present position of the vehicle and traveling direction thereof from the GPS signal received by the GPS receiver 4 and from the signal supplied from the self-contained navigation sensor 5. The controller reads the map data covering the present vehicle position and its surroundings from the DVD 1 to store it in the buffer memory 12. The map drawing section 19 generates a map image based on the map data in the buffer memory 12, and displays the map image covering the vehicle position and its surroundings on the display device 7 with the vehicle position mark indicative of the present vehicle position superimposed thereon. Then, the controller 17 causes the vehicle position mark on the map image to move, or the map image to be scrolled, while the vehicle is traveling.

After the user sets the destination by manipulating the operating section 3, the controller 17 sets the present vehicle position as a starting point, and searches for the guidance route from the starting point to the destination under the set condition. Then, the guidance route information obtained by the route search is stored in the guidance route storage section 22. The controller 17 appropriately communicates the guidance information while the vehicle is traveling, and guides the vehicle to the destination along the guidance route.

Figure 2:
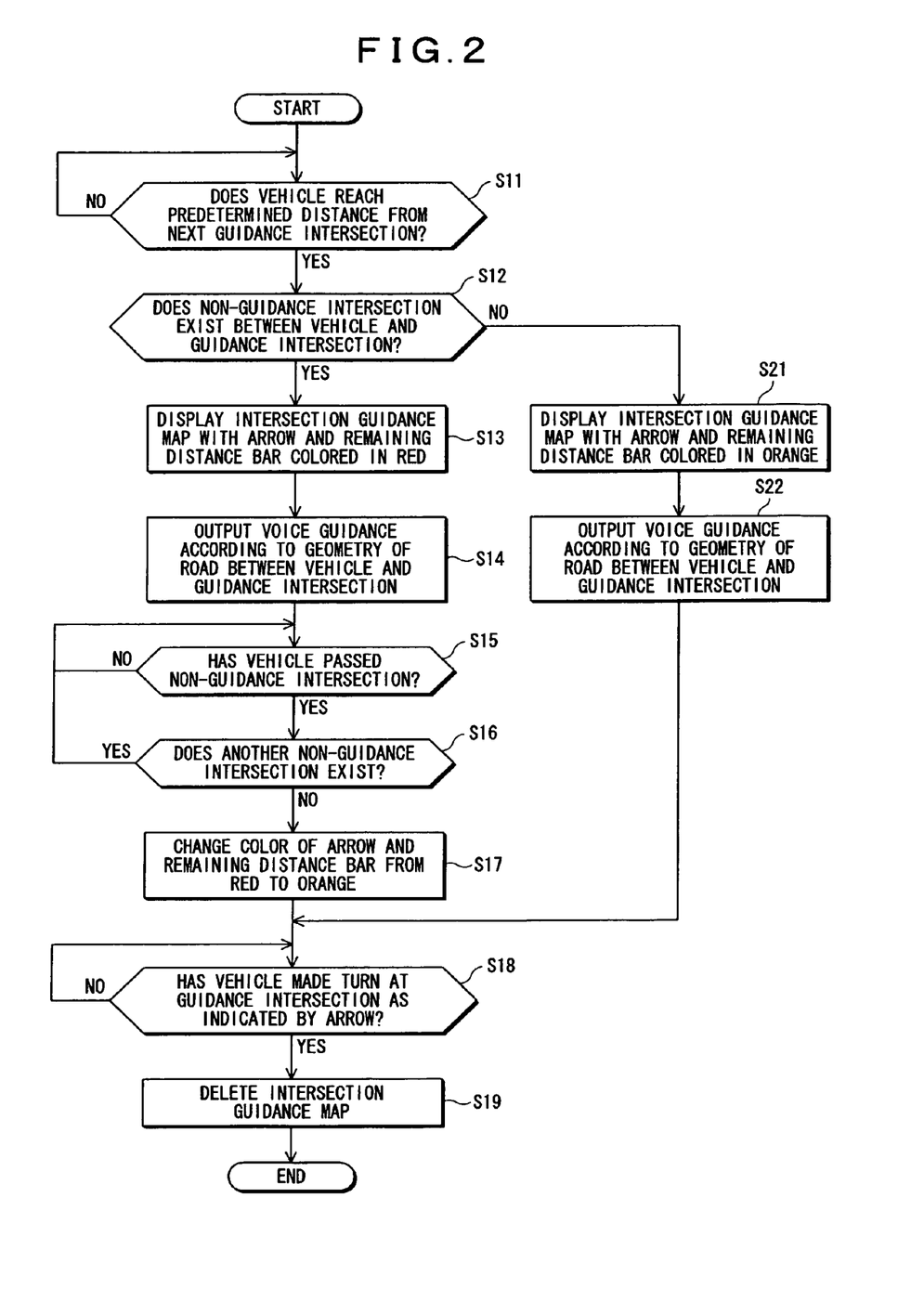
FIG. 2 is a flowchart showing the operation of the vehicle navigation apparatus of the embodiment when a vehicle travels along a guidance route.

Now, the operation of the vehicle navigation apparatus of the present embodiment performed when the vehicle travels along the guidance route will be explained below with reference to the flowchart of FIG. 2.

First, at step S11, the controller 17 calculates a distance between the vehicle position and a next guidance intersection, using the present vehicle position detected from signals received from the GPS receiver 4 and the self-contained navigation sensor 5, and the guidance route information stored in the guidance route storage section 22. When the vehicle reaches a predetermined distance (for example, 300 m) from the next guidance intersection, the operation proceeds to step S12.

At step S12, the controller 17 determines whether or not a non-guidance intersection exists between the vehicle position and the next guidance intersection, with reference to the map data read from the DVD 1. If a non-guidance intersection does not exist between the vehicle position and the next guidance intersection (No), the operation proceeds to step S21. If the non-guidance intersection exists (Yes), the operation proceeds to step S13. Hereinafter, the case where no non-guidance intersection is found and the operation proceeds to step S21 will be described in detail.

At step S21, the controller 17 controls the buffer memory 12 and the operation screen and mark drawing section 21 to generate an intersection guidance map regarding the next guidance intersection. Further, it controls the map drawing section 19 and the operation screen and mark drawing section 21 to divide a screen of the display device 17 into two parts, on one of which the map image of the surroundings of the present vehicle position is displayed, and on the other of which the intersection guidance map is displayed.

Figure 3:
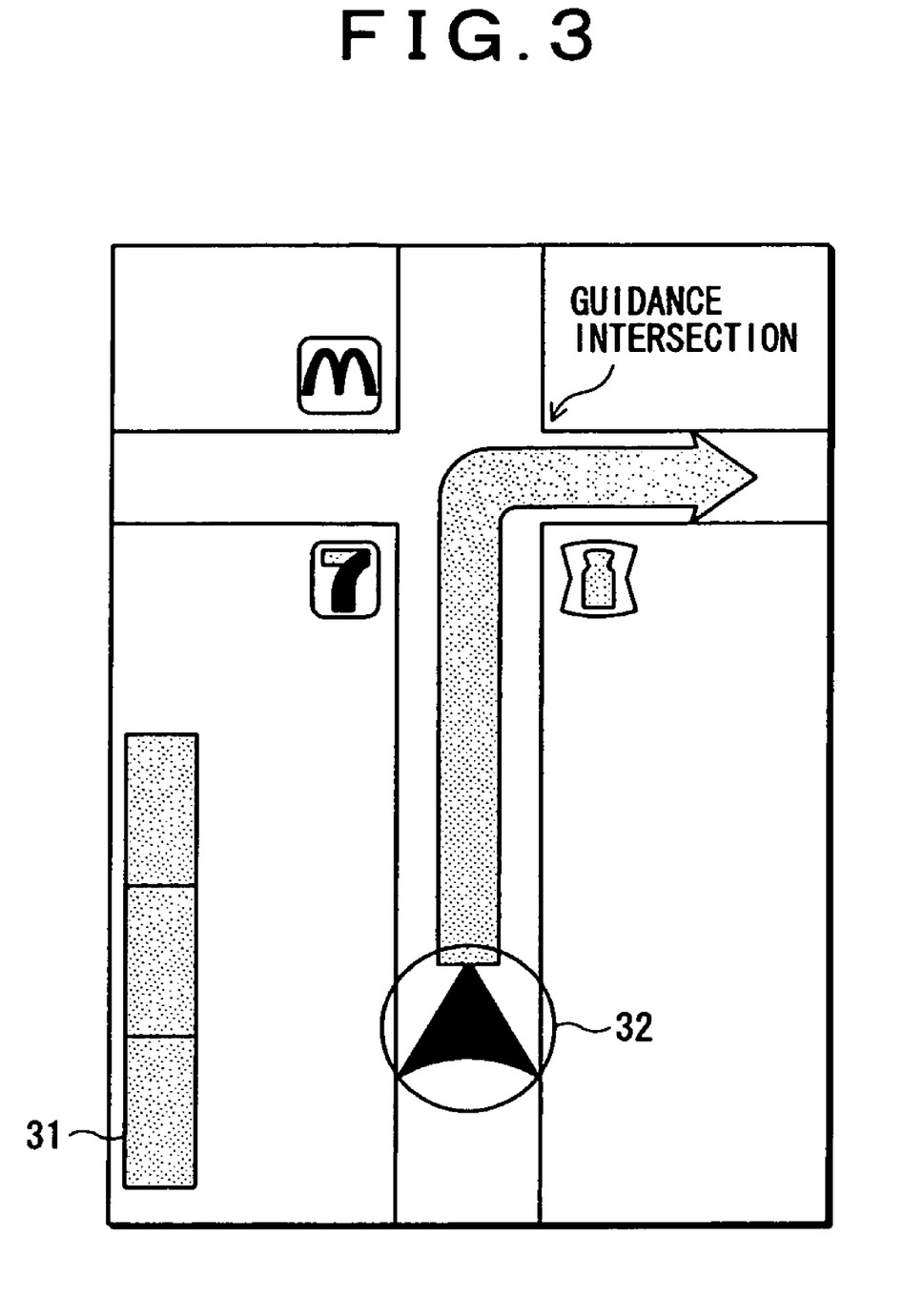
FIG. 3 is a diagram of an exemplary intersection guidance map displayed on a display device when the vehicle navigation apparatus of the embodiment determines that a non-guidance intersection does not exist between the vehicle position and a next guidance intersection.

FIG. 3 illustrates a diagram of an exemplary intersection guidance map displayed on the display device 7 when the controller 17 determines that there is no non-guidance intersection between the vehicle position and the guidance intersection. As shown in FIG. 3, in the intersection guidance map, geometries of roads located around the guidance intersection are displayed in the form of a simple figure or map, while a distance to the next guidance intersection is represented by the length of a remaining distance bar 31. The intersection guidance map includes a vehicle position mark 32, an arrow indicative of the guidance route, and landmarks located in the vicinity of the guidance intersection. In the present embodiment, when the controller determines that no non-guidance intersection exists between the vehicle position and the guidance intersection, the arrow and the remaining distance bar 31 are displayed in a color such as orange (in pale gray in FIG. 3: the second display form).

After the intersection guidance map such as that shown in FIG. 3 is displayed on the display device 7, the operation proceeds to step S22, where the controller 17 generates voice guidance data, such as "Turn right at the next intersection", and supplies it to the voice output section 24. Thus, for example, the message (voice guidance) such as "Turn right at the next intersection" is communicated from the speaker 9 by voice, and then the operation proceeds to step S18.

Figure 4:
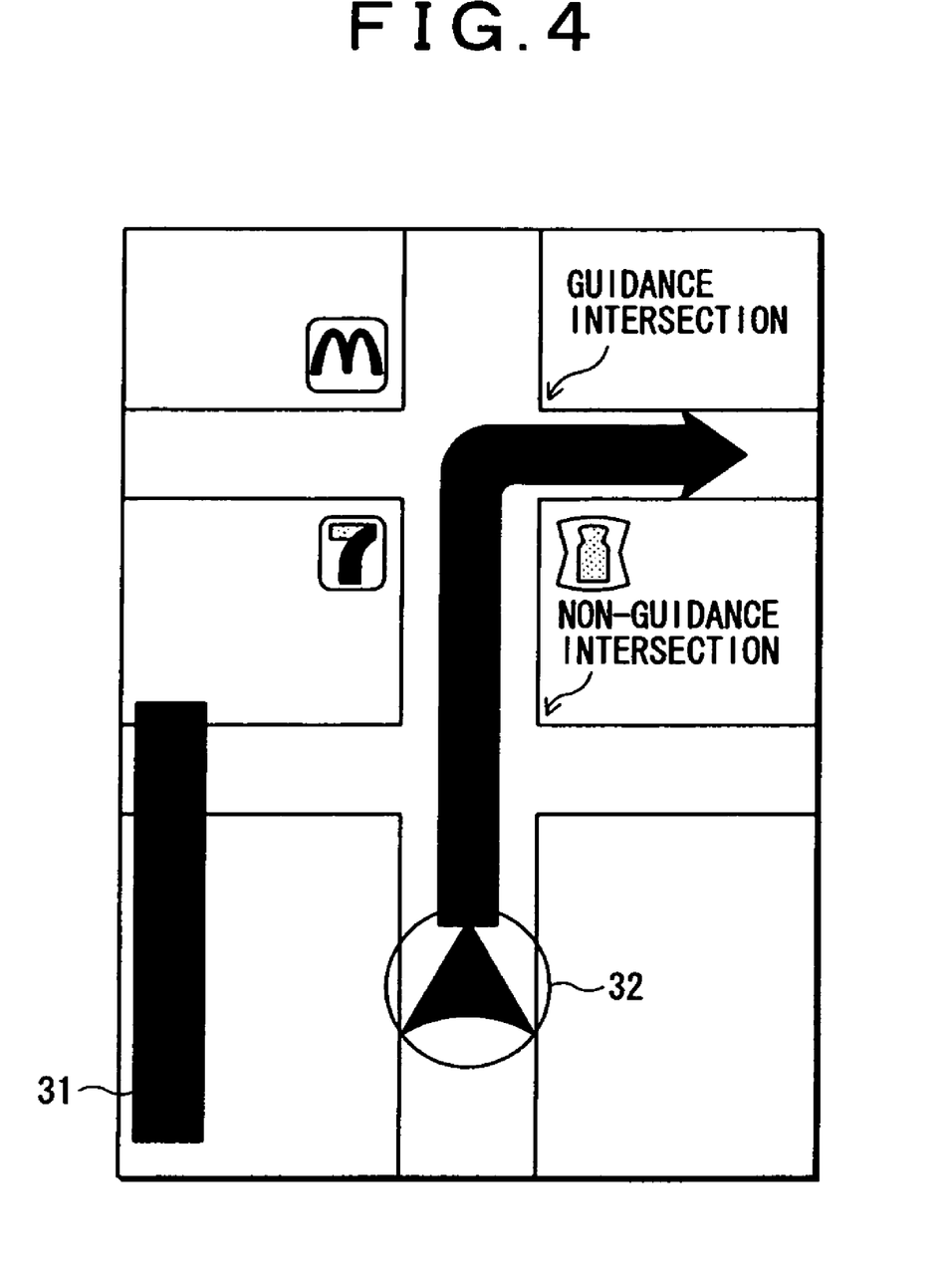
FIG. 4 is a diagram of an exemplary intersection guidance map displayed on the display device when the vehicle navigation apparatus of the embodiment determines that a non-guidance intersection exists between the vehicle position and a next guidance intersection.

In contrast, when the operation proceeds from step S12 to step S13, that is, if a non-guidance intersection exists between the vehicle position and the guidance intersection, the controller 17 controls the buffer memory 12, the map drawing section 19, and the operation screen and mark drawing section 21 to generate an intersection guidance map such as that shown in FIG. 4, and then displays the guidance map on the display device 7. As shown in FIG. 4, when a non-guidance intersection exists between the vehicle position and the guidance intersection, an arrow indicative of the guidance route and a remaining distance bar 31 indicative of a distance to the guidance intersection are displayed in another color such as red (in dark gray in FIG. 4: the first display form).

Thereafter, the operation proceeds to step S14, where the controller 17 generates voice guidance data, such as "Turn right at the second intersection", according to geometries of the roads between the vehicle position and the guidance intersection, and supplies it to the voice output section 24. Thus, the message "Turn right at the second intersection" is communicated from the speaker 9 by voice.

Then, at step S15, the controller 17 determines whether or not the vehicle has passed the non-guidance intersection. If the vehicle has passed the non-guidance intersection, the operation proceeds to step S16. At step S16, the controller 17 determines whether or not another non-guidance intersection exists between the vehicle and the guidance intersection. If another non-guidance intersection is determined to exist, the operation returns to step S15, and the controller monitors the position of the vehicle until the vehicle passes through the non-guidance intersection.

Figure 5:
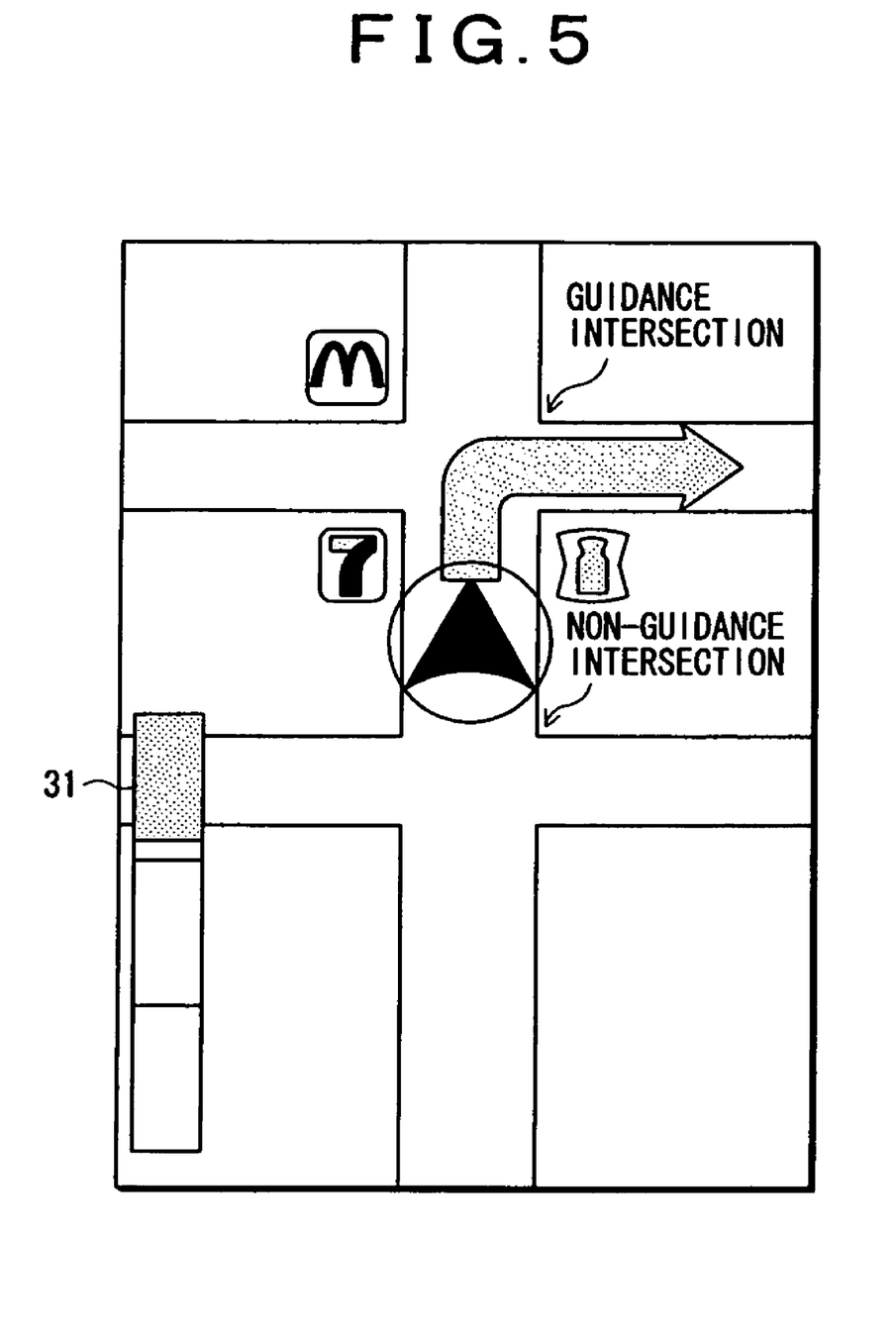
FIG. 5 is a diagram of an intersection guidance map displayed when the vehicle navigation apparatus of the embodiment determines that a non-guidance intersection does not exist between the vehicle position and the guidance intersection.

On the other hand, if it is determined at step S16 that another non-guidance intersection does not exist between the vehicle and the guidance intersection, the operation proceeds to step S17. The controller 17 controls the operation screen and mark drawing section 21 to change the color of the arrow indicative of the guidance route and the remaining distance bar 31 indicative of the distance to the guidance intersection, from red to orange in this example (in pale gray in FIG. 5: the second display form).

Then, at step S18, the controller 17 determines whether or not the vehicle has passed the guidance intersection, based on the present vehicle position and the map data. When the vehicle is determined to have passed the guidance intersection, the intersection guidance map is deleted from the screen of the display device 7 at step S19, and then the map image covering the present vehicle position and its surroundings is displayed on the entire screen, thus completing the guidance at the guidance intersection.

As can be seen from the above, in the vehicle navigation apparatus of the present embodiment, it is determined whether or not a non-guidance intersection exists between the guidance intersection and the vehicle position when the vehicle reaches the predetermined distance from the next guidance intersection. If a non-guidance intersection exists, the intersection guidance map with the arrow indicative of the guidance route colored in one color (red) is displayed on the display device 7. If the non-guidance intersection does not exist between the guidance intersection and the vehicle, the color of the arrow indicative of the guidance route is changed to another color (orange). Thus, the mark being displayed in a predetermined color permits a user to understand the existence of a non-guidance junction between the vehicle position and the guidance intersection at a glance. Changing the color of the arrow can instruct the user to make the turn at the next intersection, thereby enabling the user to travel the guidance route with no mistakes. This permits the user to travel to the destination with safety and comfort.

It should be noted that although the above guidance operation is concerned with road intersections in the vehicle navigation apparatus of the embodiment, the invention is not limited thereto. For example, when the vehicle approaches junctions on a loop-shaped road (which is the so-called "roundabout") or toll gates on a toll road located at relatively short intervals, the similar guidance operation may be performed.

Figure 6A:
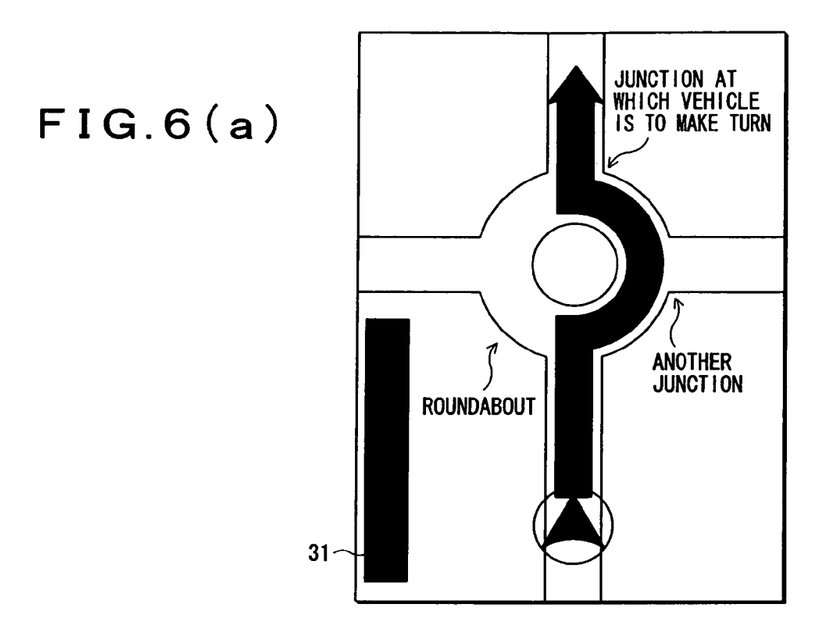
FIG. 6(a) is a diagram of an exemplary junction guidance map displayed on the display device when the vehicle navigation apparatus of the embodiment determines that another junction exists between the vehicle position and a junction of interest at which the vehicle is to make a turn in a case where the junction of interest is located on a roundabout, more specifically, when the vehicle reaches a predetermined distance from the junction at which it is to make the turn.
Figure 6B:
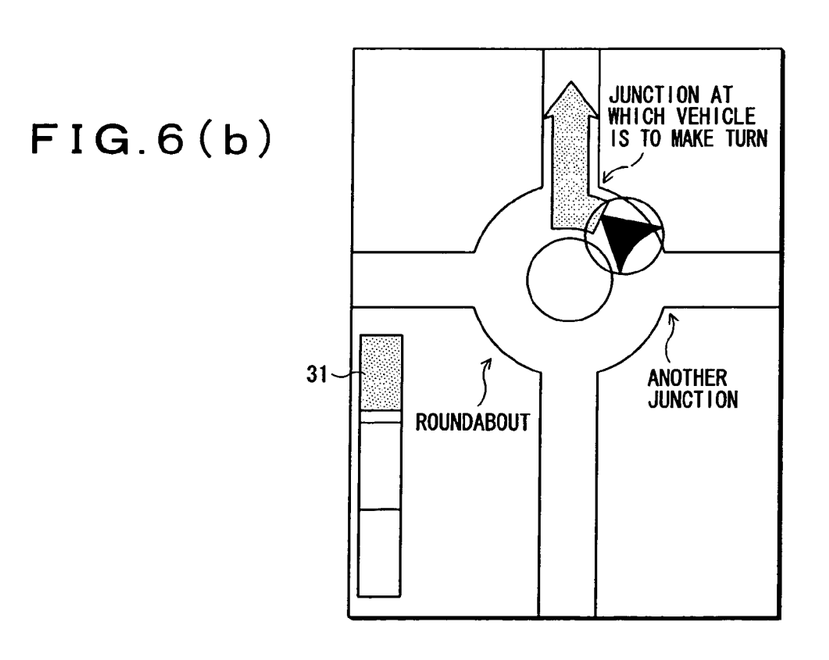
FIG. 6(b) is a diagram of another exemplary junction guidance map displayed when the vehicle navigation apparatus determines that another junction does not exist between the vehicle and the junction of interest at which the vehicle is to make the turn.

For example, in cases where a junction (guidance junction) at which the vehicle is subsequently to make a turn is located on a roundabout, when the vehicle is approaching the guidance junction, the controller 17 determines whether or not another junction (non-guidance junction) exists between the vehicle position and the guidance junction. If a non-guidance junction is determined to exist, a junction guidance map with an arrow indicative of a guidance route and a remaining distance bar 31 colored in a color such as red (in dark gray in FIG. 6(a)) are displayed on the display device 7, as shown in FIG. 6(a). If another non-guidance junction is not found between the vehicle position and the guidance junction after the vehicle has passed the non-guidance junction as shown in FIG. 6(b), the color of the arrow indicative of the guidance route and the remaining distance bar 31 is changed, e.g., from red to orange (in pale gray in FIG. 6(b)). This enables the user to drive the guidance route, while making the turn at the appropriate junction on the roundabout at which the vehicle is to turn, without any mistakes.

Figure 7:
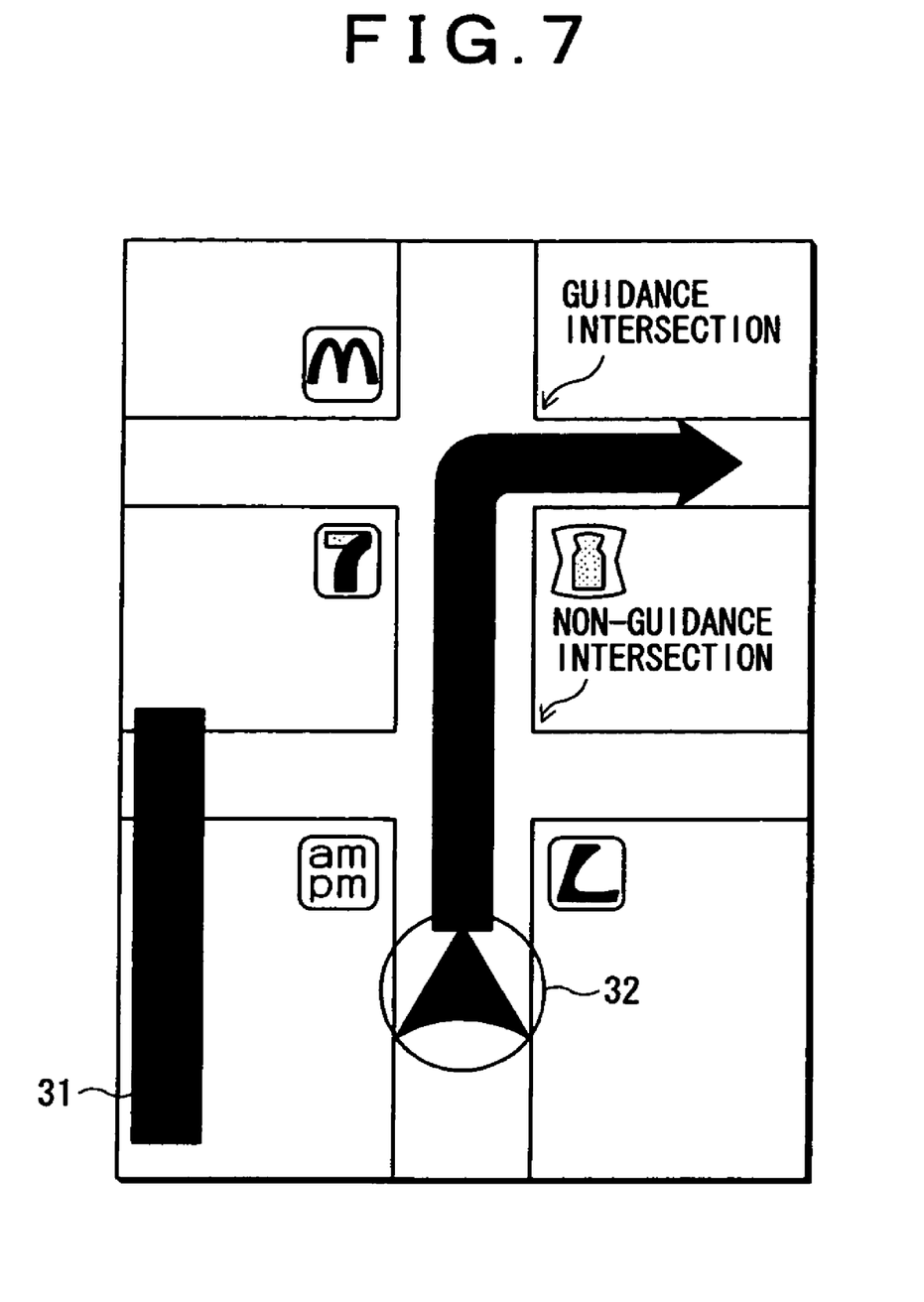
FIG. 7 is a diagram of an exemplary intersection guidance map displaying a landmark indicative of a facility located in the vicinity of the non-guidance intersection.

In the vehicle navigation apparatus of the described embodiment, when a non-guidance intersection exists between the vehicle position and the next guidance intersection, the intersection guidance map is displayed in the form of a simple figure, which includes only the landmarks located in the vicinity of the guidance intersection. However, the invention is not limited thereto. For example, as shown in FIG. 7, in the case of a non-guidance intersection existing between the vehicle position and the next guidance intersection, not only the landmarks located near the guidance intersection, but also landmarks located in the vicinity of the non-guidance intersection may also be displayed in the form of a simple figure. This enables the user to clearly recognize the non-guidance intersection as well as the guidance intersection.

In the vehicle navigation apparatus of the described embodiment, when a non-guidance intersection is determined to exist between the vehicle position and the next guidance intersection, the arrow indicating the guidance route and the remaining distance bar indicating the distance to the guidance intersection are first displayed in a color such as red. After no intermediate non-guidance intersection is found between the vehicle position and the guidance intersection, the color of the arrow indicative of the guidance route and the remaining distance bar indicative of the distance to the guidance intersection is changed into another color such as orange. The display form of the arrow and remaining distance bar is not limited thereto. For example, the arrow and the remaining distance bar may be displayed in any colors other than red and orange. Alternatively, or additionally, when a non-guidance intersection exists between the vehicle position and the guidance intersection, the arrow indicative of the guidance route and the remaining distance bar can be displayed in a predetermined color in a blinking form. When no non-guidance intersection is found between the vehicle position and the guidance intersection, the arrow indicative of the guidance route and the remaining distance bar can be displayed in the same color in a continuous form. Further, although a traveling direction on the guidance route is represented by the arrow in the present embodiments, the traveling direction on the guidance route may be represented by any type of line (for example, a broken line, a dashed line, or the like) in any specific color.

(Variants)

Vehicle navigation apparatuses are classified into a map-type navigation apparatus which guides a vehicle to the destination by displaying a map image on a display device as mentioned above, and an arrow navigation apparatus (turn-by-turn navigation apparatus) which displays only an arrow indicative of a traveling direction to be taken by the vehicle. The arrow navigation apparatus has a simple graphic function, as compared to the map-type navigation apparatus, and can only display characters and simple figures on the display device. The basic configuration is the same as that of the vehicle navigation apparatus (map-type navigation apparatus) shown in FIG. 1, so that the explanation thereof will be omitted.

Figure 8A:
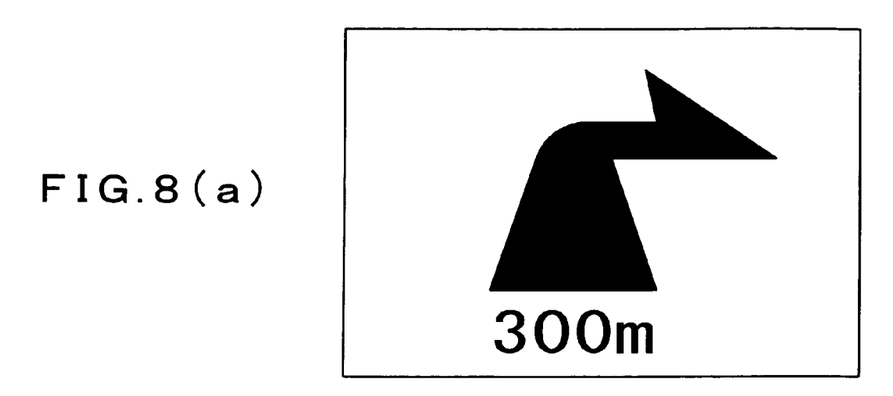
FIG. 8(a) is a diagram of another exemplary intersection guidance map displayed on the display device in the vehicle navigation apparatus when the vehicle reaches the predetermined distance from the intersection of interest at which it is to make the turn in a case where the apparatus determines that another intersection exists between the vehicle position and the intersection of interest at which the vehicle is subsequently to make the turn.
Figure 8B:
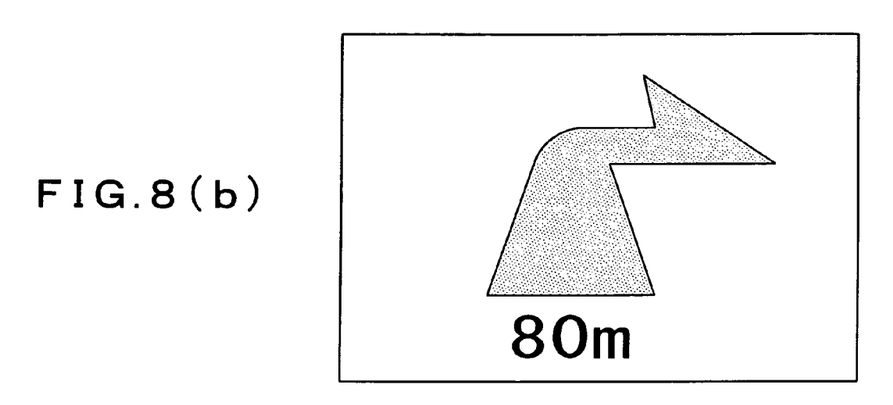
FIG. 8(b) is a diagram of an exemplary intersection guidance map displayed in the same navigation apparatus when the apparatus determines that another intersection does not exist between the vehicle position and the intersection of interest at which the vehicle is subsequently to make the turn.

When the invention is applied to the arrow navigation apparatus, the following operation will be performed. That is, when the vehicle reaches a predetermined distance (for example, 300 m) from an intersection (guidance intersection) at which it is subsequently to make a turn, the controller of the navigation apparatus determines whether or not another intersection (non-guidance intersection) exists between the vehicle position and the guidance intersection. As shown in FIG. 8(a), when a non-guidance intersection is determined to exist, a red arrow indicative of a traveling direction to be taken (illustrated in dark gray in FIG. 8(a)) and a distance to the guidance intersection (300 m in FIG. 8(a)) are displayed on the display device. When the vehicle has passed the non-guidance intersection and another intersection does not exist between the vehicle position and the guidance intersection, the controller changes the color of the arrow indicative of the direction to be taken, e.g., from red to orange, as shown in FIG. 8(b).

Figure 8C:
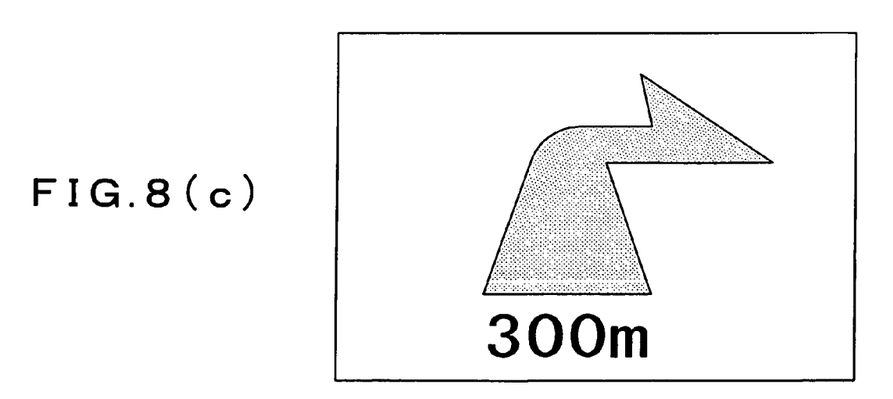
FIG. 8(c) is a diagram of an exemplary intersection guidance map displayed when the vehicle reaches the predetermined distance from the intersection of interest at which it is to make the turn in a case where the apparatus determines that another intersection does not exist between the vehicle position and the intersection of interest at which the vehicle is subsequently to make the turn.

When the vehicle reaches the predetermined distance from the guidance intersection and no non-guidance intersection exists between the vehicle and the guidance intersection, an orange arrow indicative of the direction to be taken (pale gray in FIG. 8(c)) and a distance to the guidance intersection (300 m in FIG. 8(c)) are displayed on the display device, as shown in FIG. 8(c).

As can be seen from the above, when the invention also is applied to the arrow navigation apparatus, a risk of making a wrong turn is reduced, thereby reliably guiding the vehicle to the destination along the guidance route.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle navigation apparatus comprising:
    a display device;
    a vehicle position detector;
    a map-data storage section configured for storing therein map data; and
    a controller configured for searching for a guidance route from a starting point to a destination based on the map data read from the map-data storage section, and for displaying on the display device a mark indicative of a traveling direction to be taken at a next intersection on the guidance route where the vehicle is to make a turn such that the vehicle is directed along the guidance route,
    wherein, when the vehicle reaches a predetermined distance from the intersection at which the vehicle is to make the turn, said controller determines whether or not a non-guidance intersection exists on the guidance route between the vehicle position and said intersection, and if said non-guidance intersection exists, the controller displays said mark in a first display form, whereas if said non-guidance intersection does not exist on the guidance route between the vehicle position and the intersection at which the vehicle is to make the turn, the controller displays the same mark in a second display form different than the first display form;
    and wherein if said non-guidance intersection exists on the guidance route between the vehicle position and said intersection when the vehicle reaches the predetermined distance from said intersection, so that the controller displays said mark in the first display form, when the vehicle passes said non-guidance intersection on the guidance route the controller changes the display of said mark from the first display form to the second display form.

2. The vehicle navigation apparatus according to claim 1, wherein, when the vehicle reaches the predetermined distance from the intersection at which the vehicle is to make the turn, said controller displays a remaining distance bar indicative of a distance to the intersection at which the vehicle is to make the turn, together with the mark on the display device.

3. The vehicle navigation apparatus according to claim 2, wherein, when the mark is displayed in the first display form, the remaining distance bar indicative of the distance to the intersection is displayed in said first display form, and when the mark is displayed in the second display form, the remaining distance bar indicative of the distance to the intersection is displayed in said second display form.

4. The vehicle navigation apparatus according to claim 1, wherein the mark displayed in the first display form and the mark displayed in the second display form differ from each other in color.

5. The vehicle navigation apparatus according to claim 1, wherein one of the first display form and the second display form is a blinking form, and the other is a continuous form.

6. The vehicle navigation apparatus according to claim 1, further comprising voice output means for communicating a message by voice in response to a signal from the controller.

7. The vehicle navigation apparatus according to claim 6, wherein, when the vehicle reaches the predetermined distance from the intersection at which the vehicle is to make the turn, said controller changes the contents of voice guidance, depending on whether or not said non-guidance intersection exists between the vehicle position and the intersection at which the vehicle is to make the turn.

8. The vehicle navigation apparatus according to claim 1, wherein, when the vehicle reaches the predetermined distance from the intersection at which the vehicle is to make the turn, said controller displays a simple figure including the intersection at which the vehicle is to make the turn, on the display device.

9. The vehicle navigation apparatus according to claim 8, wherein said controller displays a landmark located in the vicinity of the intersection at which the vehicle is to make the turn.

10. The vehicle navigation apparatus according to claim 9, wherein said controller displays another landmark located in the vicinity of said non-guidance intersection.

11. A vehicle navigation apparatus comprising:
    a display device;
    a vehicle position detector;
    a map-data storage section configured for storing therein map data; and
    a controller configured for searching for a guidance route from a starting point to a destination based on the map data read from the map-data storage section, and for displaying on the display device an arrow indicative of a traveling direction to be taken at a next intersection on the guidance route where the vehicle is to make a turn such that the vehicle is directed along the guidance route,
    wherein, when the vehicle reaches a predetermined distance from the intersection at which the vehicle is to make the turn, said controller determines whether or not a non-guidance intersection exists on the guidance route between the vehicle position and said intersection, and if said non-guidance intersection exists, the controller displays said arrow in a first display form, whereas if said non-guidance intersection does not exist on the guidance route between the vehicle position and the intersection at which the vehicle is to make the turn, the controller displays the same arrow in a second display form different than the first display form;
    and wherein if said non-guidance intersection exists on the guidance route between the vehicle position and said intersection when the vehicle reaches the predetermined distance from said intersection, so that the controller displays said arrow in the first display form, when the vehicle passes said non-guidance intersection on the guidance route the controller changes the display of said arrow from the first display form to the second display form.

12. The vehicle navigation apparatus according to claim 11, wherein, when the vehicle reaches the predetermined distance from the intersection at which the vehicle is to make the turn, said controller displays a remaining distance bar indicative of a distance to the intersection at which the vehicle is to make the turn, together with the arrow on the display device.

13. The vehicle navigation apparatus according to claim 12, wherein, when the arrow is displayed in the first display form, the remaining distance bar indicative of the distance to the intersection is displayed in said first display form, and when the arrow is displayed in the second display form, the remaining distance bar indicative of the distance to the intersection is displayed in said second display form.

14. The vehicle navigation apparatus according to claim 11, wherein the arrow displayed in the first display form and the arrow displayed in the second display form differ from each other in color.

15. The vehicle navigation apparatus according to claim 11, wherein one of the first display form and the second display form is a blinking form, and the other is a continuous form.

16. The vehicle navigation apparatus according to claim 11, further comprising voice output means for communicating a message by voice in response to a signal from the controller.

17. The vehicle navigation apparatus according to claim 16, wherein, when the vehicle reaches the predetermined distance from the intersection at which the vehicle is to make the turn, said controller changes the contents of voice guidance, depending on whether or not said non guidance intersection exists between the vehicle position and the intersection at which the vehicle is to make the turn.

18. The vehicle navigation apparatus according to claim 11, wherein, when the vehicle reaches the predetermined distance from the intersection at which the vehicle is to make the turn, said controller displays a simple figure including the intersection at which the vehicle is to make the turn, on the display device.

19. The vehicle navigation apparatus according to claim 18, wherein said controller displays a landmark located in the vicinity of the intersection at which the vehicle is to make the turn.

20. The vehicle navigation apparatus according to claim 19, wherein said controller displays another landmark located in the vicinity of said non-guidance intersection.

21. A method of providing guidance to a user of a vehicle navigation apparatus regarding an intersection on a guidance route at which the vehicle is to make a turn, comprising:
storing a guidance route from a starting point to a destination;
detecting a present position of a vehicle;
when the vehicle reaches a predetermined distance from a next intersection on the guidance route at which the vehicle is to make a turn, determining whether or not a non-guidance intersection exists on the guidance route between the vehicle position and said intersection;
if said non-guidance intersection exists, displaying an indication of the traveling direction to be taken at said intersection in a first display form; and
if said non-guidance intersection does not exist, displaying the same indication of the traveling direction in a second display form different than the first display form;
wherein, if said non-guidance intersection exists on the guidance route between the vehicle position and said intersection when the vehicle reaches the predetermined distance from said intersection, so that said indication is displayed in the first display form, when the vehicle passes said non-guidance intersection on the guidance route the display of said indication is changed from the first display form to the second display form.

* * * * *